United States Patent [19]
Brahm

[11] Patent Number: 6,035,592
[45] Date of Patent: Mar. 14, 2000

[54] CONVEYOR GALLERY LATERAL RESTRAINT SYSTEM

[75] Inventor: David A. Brahm, Redondo Beach, Calif.

[73] Assignee: Temcor, Carson, Calif.

[21] Appl. No.: 09/045,288

[22] Filed: Mar. 20, 1998

[51] Int. Cl.[7] ........................ E04H 7/22
[52] U.S. Cl. ............... 52/195; 52/196; 52/176; 52/246; 414/318
[58] Field of Search ............. 52/80.1, 81.2, 52/81.3, 86, 87, 174, 175, 176, 192, 245, 246, 248, 196, 195; 414/1, 507, 522, 523, 529, 287, 133, 318; 198/950

[56] References Cited

U.S. PATENT DOCUMENTS 4,709,435  12/1987  Stemler et al. .................. 52/248 X

*Primary Examiner*—Carl D. Friedman
*Assistant Examiner*—Yvonne Horton
*Attorney, Agent, or Firm*—Christie Parker & Hale, LLP

[57] ABSTRACT

A conveyor gallery lateral restraint system for a reticulated dome structure includes a pair of load transfer pads integrated into the conveyor gallery and dome structure. Only loads normal to the outer surfaces of the load transfer pads, and thus loads along the reticulated surface of the dome structure, are transferred to the dome structure by the load transfer pads. Because of characteristics of the load transfer pads and their orientation relative to the dome surface, substantially no loads that are normal to the surface of the dome structure are transferred to the dome structure by the conveyor gallery.

7 Claims, 4 Drawing Sheets

CONVEYOR GALLERY LATERAL RESTRAINT SYSTEM

FIELD OF THE INVENTION

The present invention relates generally to conveyor gallery lateral restraint systems, and more particularly, to a conveyor gallery lateral restraint system in which a corresponding dome structure into which the conveyor penetrates provides lateral support for the gallery.

BACKGROUND OF THE INVENTION

Domes and other enclosed structures are widely used throughout the world in a variety of applications in which material handling systems are required. For example, bulk storage facilities typically require a material handling system that is capable of penetrating the dome or enclosed structure for transporting material into and out of the structure. These bulk storage facilities may be used to store salt, coal, sand, fertilizer, etc. The material handling system generally includes a conveyor and a gallery surrounding and enclosing, at least in part, the conveyor. The gallery penetrates the dome or enclosed structure at some elevated level above the surface.

An exemplary embodiment of such a dome 10 and material handling system 12 is illustrated in FIG. 1. The elevated gallery 14 is supported at one end by a stacker/reclaimer system 16 located at the center of the dome. Outside the dome, the elevated gallery is supported by a vertical support column or framing system 18 which extends upward toward the gallery from the surface 21. For a typical dome structure, the span between the stacker/reclaimer system and the exterior framing system can be anywhere between 30 meters to 80 meters.

One of the loads that must be taken into account when designing a material handling system for a dome structure is the wind load on the section of the gallery outside of the dome structure. This section of the gallery may be exposed to horizontal wind loads that must be resisted. Since the gallery is typically isolated from the dome structure, the horizontal wind load is resisted entirely by the exterior framing system and by the stacker/reclaimer system inside the dome.

However, it can be costly to design or reinforce the stacker/reclaimer system to take the horizontal wind load from the conveyor gallery. Additionally, reinforcing the existing framing systems, or installing additional framing systems outside the dome increases the overall cost of the material handling system. Moreover, if the additional framing systems are positioned inside the dome or enclosed structure, the effective interior storage capacity of the dome is reduced.

Consequently, a need exists for an improved gallery conveyor lateral restraint system.

SUMMARY OF THE INVENTION

The present invention, therefore, provides an improved conveyor gallery lateral restraint system that utilizes, and takes advantage of the characteristics of the existing dome or enclosed structure into which the gallery penetrates. More particularly, the present invention takes advantage of the high strength exhibited by reticulated dome structures along their surface, by providing connections, or load transfer means, which do not transfer any load from the conveyor gallery to the dome structure that is normal to the surface of the dome.

In one embodiment, the lateral restraint system includes a plurality of pairs of load transfer pads. One of the load transfer pads of each pair is coupled to the conveyor gallery and the corresponding load transfer pad is coupled to the dome structure itself. The load transfer pads are aligned such that the outer surfaces of each of the load transfer pads are substantially adjacent to and in contact with one another when the conveyor gallery penetrates the dome structure. The outer surfaces of the load transfer pads are preferably aligned parallel to a radial plane through the dome, which is coincident to a central axis of the conveyor gallery. The pads are therefore aligned substantially normal to the basic dome curvature at the location in the dome at which the gallery passes through the dome. The outer surfaces of the load transfer pads also have a coefficient of friction substantially low enough such that only loads normal to the outer surfaces of the load transfer pads are transferred from the conveyor gallery to the dome structure.

BRIEF DESCRIPTION OF THE DRAWINGS

These and other features and advantages of the present invention will be appreciated as the same become better understood by reference to the following Detailed Description when considered in connection with the accompanying drawings, wherein.

DETAILED DESCRIPTION OF THE INVENTION

Figure 2:
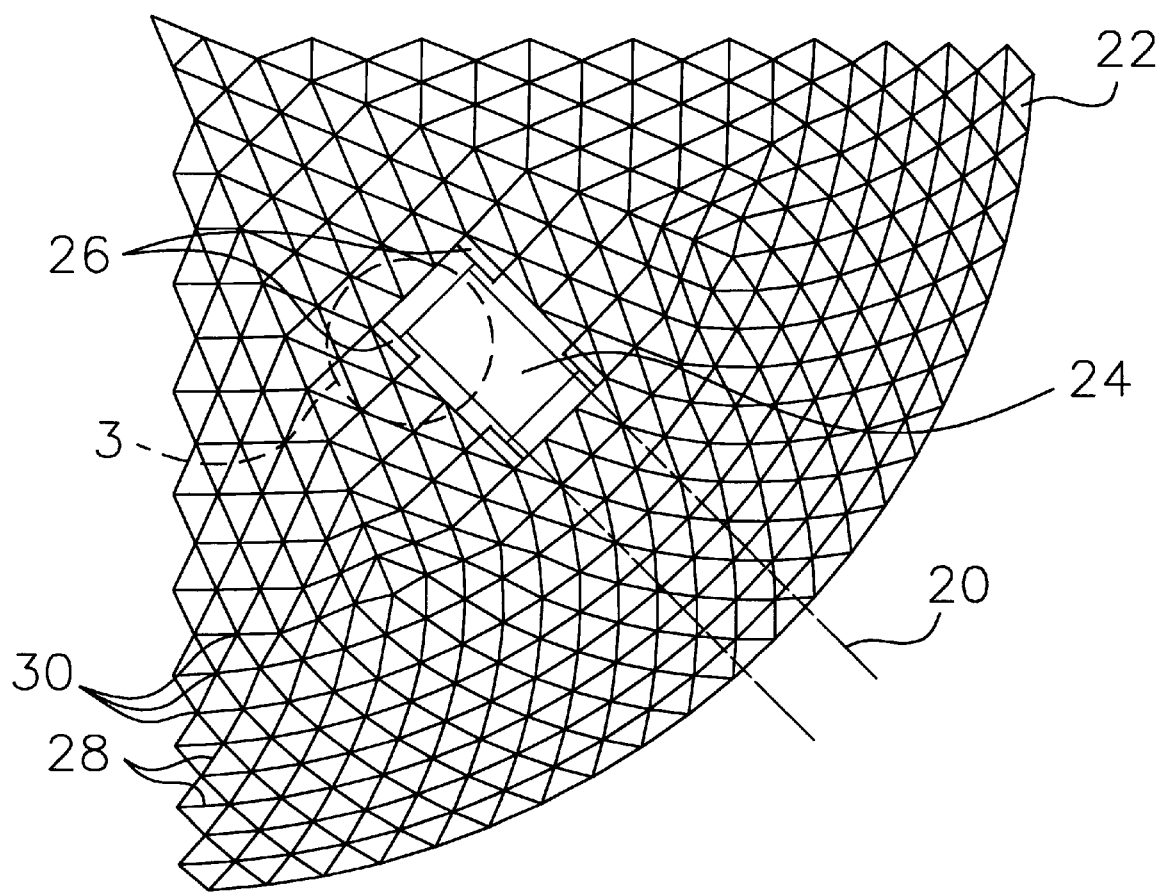
FIG. 2 is a plan elevational view of a dome schematically illustrating the conveyor gallery lateral restraint system according to the present invention.

Referring now to FIG. 2, an elevated conveyor gallery 20 is illustrated penetrating a reticulated dome structure 22. The conveyor gallery 20 contains a conveyor (not shown) which functions as a material handling system for the dome, and penetrates the dome 22 through an opening 24 in the dome structure 22. The conveyor gallery consists of a generally rectangular truss structure enclosing the conveyor, and is formed from a top wall, bottom wall, and a pair of side walls. The walls of the conveyor gallery are joined to form an upper right-hand corner, upper left-hand corner, lower right-hand corner, and lower left-hand corner of the gallery. The conveyor gallery is typically formed from steel or stainless steel, although other suitable materials known in the art may alternatively be used. A conveyor gallery lateral restraint system 26 according to the present invention is integrated into the conveyor gallery and dome structure, as will be discussed below.

Figure 1:
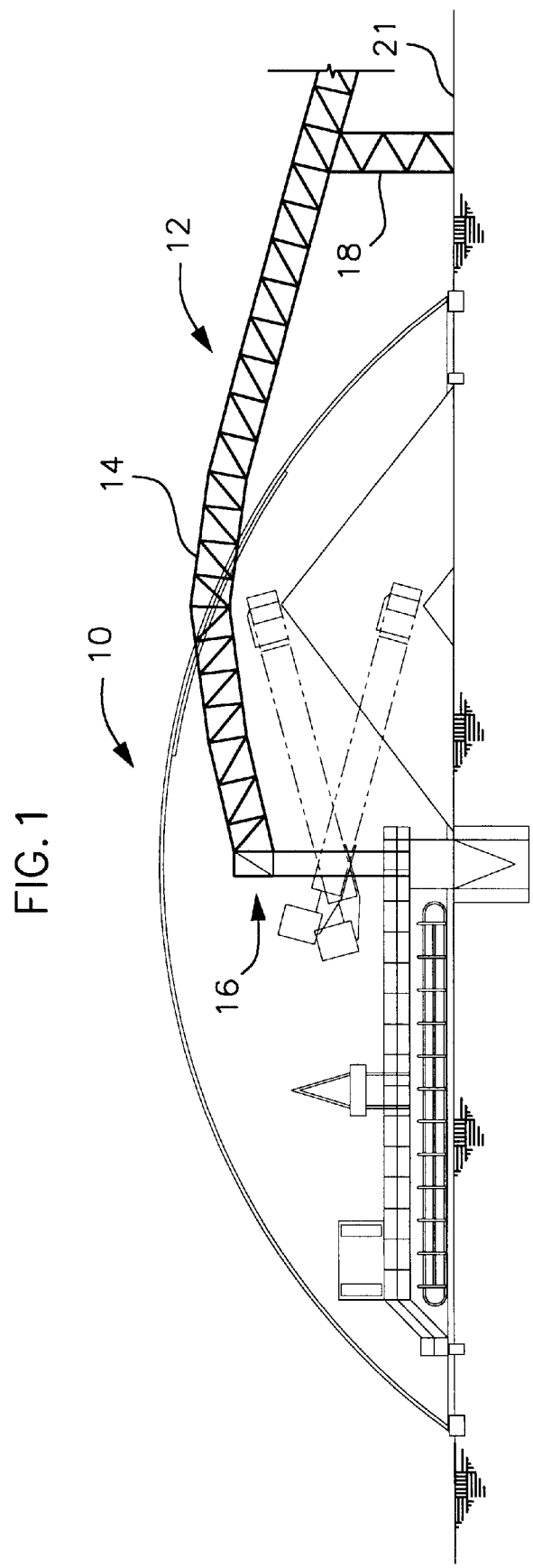
FIG. 1 is a side elevational partial cross-sectional view of a dome schematically illustrating a prior art conveyor gallery penetrating the dome.

Although not shown in FIG. 2, the conveyor gallery typically is supported at one end by a stacker/reclaimer system located at the center of the dome, and by a vertical framing system which extends upward toward the gallery from the surface, as described above in connection with the prior art system illustrated in FIG. 1.

In the embodiment illustrated in FIG. 2, the dome structure is a geodesic dome in the shape of a partial spheroid, however, those skilled in the art should realize that other shapes and forms of reticulated structures can alternatively be used in connection with the present invention. See, e.g., U.S. Pat. Nos. 5,704,169, 4,711,063, and 4,611,442 all to Richter.

The dome structure 22 preferably is formed from a network of structural members or struts 28 joined at junctions 30. The struts are connected to subdivide the network into various polygonal openings. The shapes of the openings in the present embodiment are defined by triangulating the curved surface that defines the shape of the structure and by placing junctions at the nodes and struts on the lines of the network grid.

FIG. 2 depicts the dome in structurally simplified terms by schematically illustrating the geometric aspects of the network struts and junctions. The dome structure illustrated in the figures and described in this application is merely illustrative, and those skilled in the art should understand that the present invention could alternatively be used with other dome structures.

Figure 3:
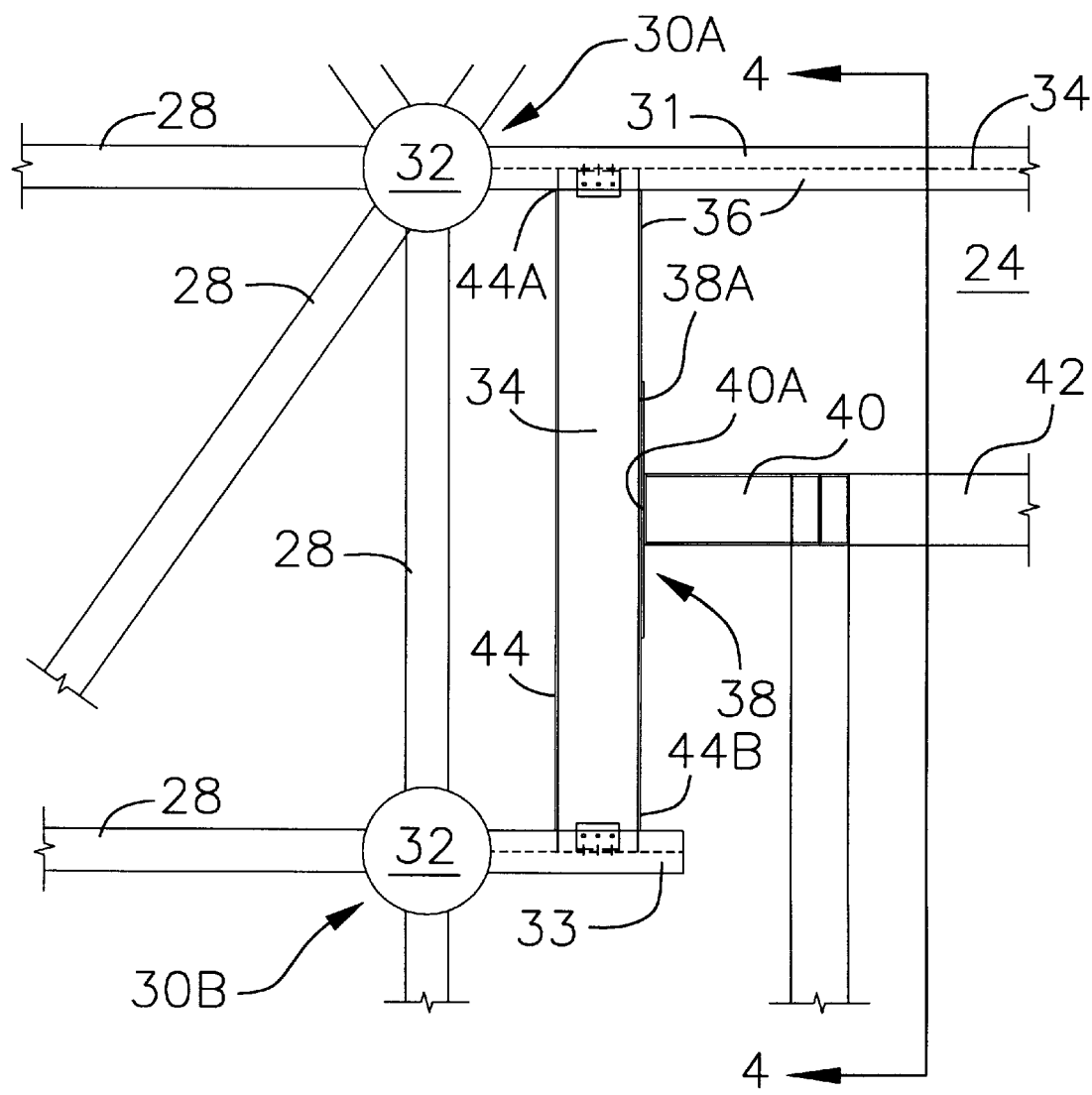
FIG. 3 is a detailed view of one of the corner lateral stabilizers of the conveyor gallery lateral restraint system of FIG. 1.

An exemplary embodiment of the network struts and junctions is illustrated in greater detail in FIG. 3. The junction 30A comprises a circular top gusset plate 32 and a circular bottom gusset plate (not shown) with struts 28 interposed between the plates. The preferred strut cross-section is that of a wide flange I-beam. Each I-beam strut has a central web 34 with a flange 36 at each end of the web to from an "I" shape. The struts 28 are fastened to the plates with conventional fasteners which extend through holes in the gusset plates and the flanges of the I-beam struts. See, e.g., U.S. Pat. No. 3,909,994 to Richter.

In the embodiment illustrated in FIG. 3, the struts and junctions of the dome structure are made of aluminum. The advantage of aluminum over other conventional construction materials hinges primarily on its corrosion resistance, its high strength to weight ratio, and its manufacturability. However, those skilled in the art should realize that other suitable materials alternatively may be used with the dome and lateral restraint system associated with the present invention.

One of the characteristics of the resulting dome structure is that it exhibits significantly high strength along its reticulated surface. The present invention, therefore, recognizes this characteristic of reticulated dome structures and utilizes the reticulated dome structure itself to provide the necessary lateral support for the conveyor gallery, by providing means for transferring horizontal loads from the conveyor gallery to the dome structure in directions in and along the surface of the dome. However, since any reticulated dome structure is relatively weak normal to its surface, the lateral restraint system according to the present invention must do so without transferring substantially any additional load normal to the surface of the dome.

Another characteristic of reticulated domes is that they undergo radial deflections and displacements due to thermal expansion and applied loads. The lateral restraint system described herein accommodates these displacements without inducing stresses in the dome members.

Figure 4:
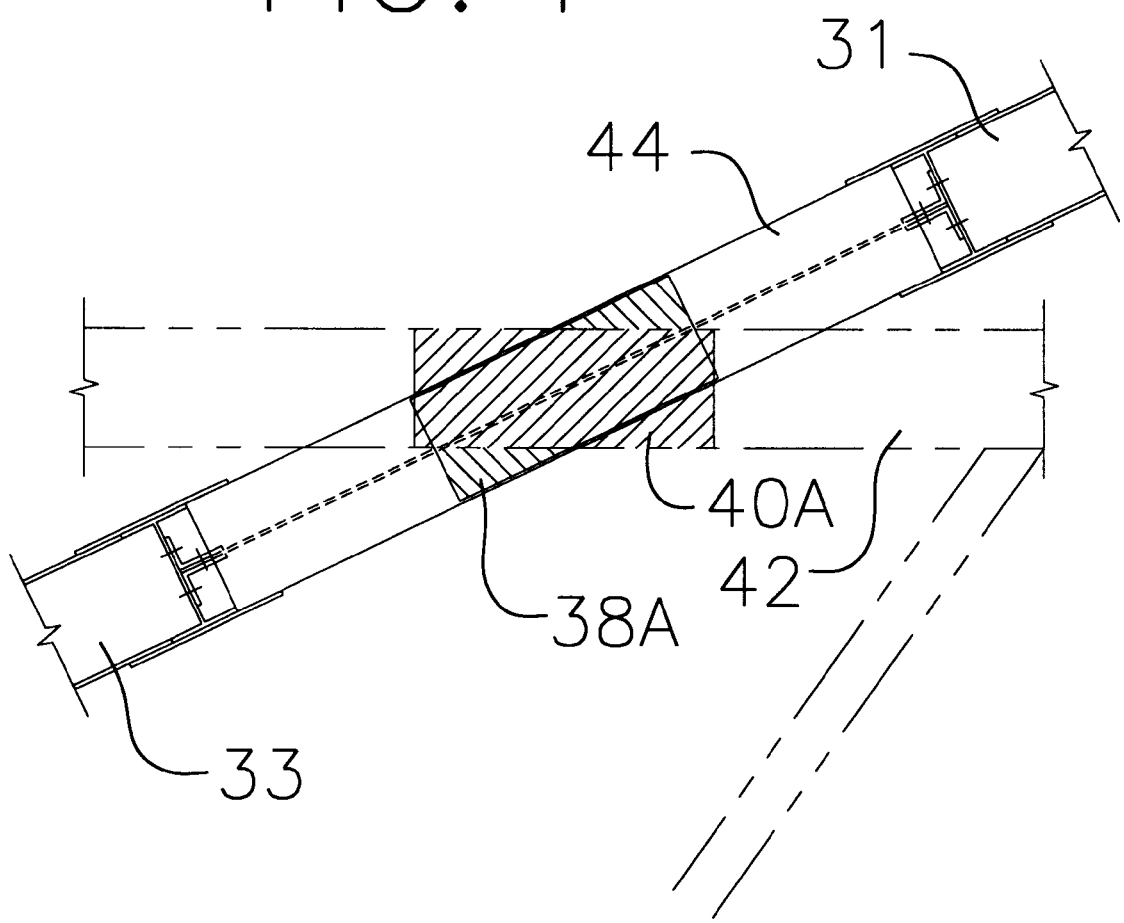
FIG. 4 is a partial cross-sectional view of the corner lateral stabilizer of FIG. 3 taken along line 4—4, with the conveyor gallery truss top chord illustrated in broken lines.

In a presently preferred embodiment illustrated in FIGS. 3 and 4, the lateral restraint system 26 includes a plurality of pairs of load transfer pads. One load transfer pad 38 of each pair is coupled to the dome structure 22 and the corresponding other load transfer pad 40 of that pair is coupled to the conveyor gallery 20. The corresponding load transfer pads are preferably aligned such that an outer surface 38A of the load transfer pad 38 coupled to the dome structure is adjacent to, and substantially in contact with, an outer surface 40A of the load transfer pad 40 coupled to the conveyor gallery where the conveyor gallery penetrates the dome structure. Also, pad surfaces 38A and 40A are preferably aligned parallel to a radial plane through the dome which is coincident to a central axis of the conveyor gallery. The pad surfaces 38A and 40A are thus in planes which are substantially normal to the curvature of the dome at the location of gallery opening 24 in the dome. Additionally, the pad surfaces 38A and 40A are preferably in a plane in which the dome structure also lies, so that no moments are transferred from the conveyor gallery to the dome structure.

Preferably, a pair of load transfer pads is provided at each corner of the conveyor gallery. Since the lateral restraint system according to the present invention is identical at each corner of the conveyor gallery, for ease of illustration the invention is illustrated in FIGS. 3 and 4 with respect to only one corner, the upper left-hand corner, of the conveyor gallery.

Each pair of load transfer pads is capable of transferring horizontal loads from the conveyor gallery 20 along the surface of the dome 20, yet does not transfer substantially any load normal to the surface of the dome 20. To accomplish these dual objectives, the outer surfaces 38A, 40A of the load transfer pads have a very low coefficient of friction for load normal to the dome surface.

In one embodiment of the present invention, the coefficient of friction of the outer surfaces of the load transfer pads is less than about 0.1, and preferably less than about 0.05. In a presently preferred embodiment, the outer surfaces of the load transfer pads are coated with a layer of polytetrafluoroethylene. Alternatively, one of the pads can carry inserts of polytetrafluoroethylene; the pads can be components of a LUBRON bearing available from Lubron Bearing Systems, Huntington Beach, Calif. The pads form planar bearings which are defined so that the lateral restraint system is capable of transferring load essentially only normal to the outer surface of the pads, and thus along the surface of the dome structure.

As can best be seen in FIG. 3, the load transfer pad 40 coupled to the conveyor gallery at its upper left-hand corner includes a pad coupled to, and extending outwardly from, the conveyor truss top chord 42. The load transfer pad 40 may be coupled to the top chord of the conveyor gallery by conventional fasteners, welding, or other means well known in the art. Preferably, the main body of the load transfer pad 40 is made from the same material as the conveyor gallery. A low friction surfacing material or bearing plate is carried by the main body to provide the desired characteristics described above.

In the embodiment illustrated in FIGS. 3 and 4, the load transfer pad 38 is coupled to the dome structure through the use of a load transfer beam 44. The load transfer beam is carried by and connected to the dome structure near adjacent joints 30A and 30B of the dome and lies in the reticulated surface of the structure. The load transfer beam partially frames the opening 24 in the dome structure 22 through which the conveyor gallery 20 penetrates. One end 44A of the load transfer beam 44 is coupled by conventional means to a strut 31 that is connected to joint 30A and the other end 44B of the load transfer beam is coupled by conventional means to a stub strut 33 that is connected to joint 30B. The transfer beam has its web 34 disposed essentially in the dome surface so that its flange 36 forms a mounting surface for load transfer pad 38. As can be seen from FIG. 3, the strut 31 also partially frames the opening 24 in the dome structure. The load transfer pad 38 is coupled to the side of the load transfer beam 44 facing the corresponding load transfer pad 40, so that it is adjacent to, and substantially in contact with, the load transfer pad 40 when the conveyor gallery penetrates the dome structure.

In a presently preferred embodiment, the load transfer beam is an aluminum wide flange I-beam similar to struts 28 of the dome structure.

The resulting configuration of the lateral restraint system is such that the corresponding bearing surfaces of the load transfer pads at each corner of the conveyor gallery are adjacent to, and substantially in contact with, one another when the conveyor gallery penetrates the dome structure. As a result of the characteristics of the bearing surfaces, only loads normal to the outer surfaces of the load transfer pads, and thus loads along the reticulated surface of the dome structure, are transferred to the dome structure. Because of the very low coefficient of friction of polytetrafluoroethylene, which is a preferred bearing surface material, substantially no loads that are normal to the reticulated surface of the dome structure are transferred to the dome structure.

The conveyor gallery lateral restraint system according to the present invention is easily installed during the construction of the dome structure itself. The load transfer pads 40 are coupled to the conveyor gallery at the appropriate locations as the conveyor gallery is installed in the dome structure. Then, at each appropriate junction, a stub strut 33 is installed to receive a corresponding load transfer beam. Once the stub strut is installed, a load transfer beam carrying the load transfer pad 38 is installed and aligned between the stub strut 33 and strut 31 so that the load transfer pad 38 is adjacent to, and substantially in contact with, the load transfer pad 40.

For a typical reticulated dome structure, the conveyor gallery lateral restraint system according to the present invention is capable of transferring at least on the order of 50,000 pounds to the dome structure. In fact, the larger the loads induced by the conveyor gallery, the more economical the present invention is because of the relative ease with which these loads can be accommodated by the dome structure.

While various embodiments of this invention have been shown and described, it would be apparent to those skilled in the art that many modifications are possible without departing from the inventive concept herein. For example, although the present invention has been described in connection with bulk storage application, the conveyor gallery lateral restraint system may be used in any application in which it is necessary for a material handling system or other gallery structure to penetrate the dome or enclosed structure, such as in some water treatment and storage facilities, wastewater treatment facilities, and petroleum storage facilities. Additionally, although the present invention has been primarily described as using polytetrafluoroethylene on the outer surfaces of the load transfer pads, other suitable materials capable of transferring substantially only loads normal to the outer surfaces of the load transfer pads, and thus loads along the reticulated surface of the dome structure, may alternatively be used. It is, therefore, to be understood that within the scope of the appended claims, this invention may be practiced otherwise than as specifically described.

What is claimed is:

1. In the combination of a space-enclosing structure and a conveyor gallery which extends through an opening in an enclosure surface defined by the structure, a gallery lateral restraint system which includes:

a plurality of pairs of load-transferring bearing pads having cooperating essentially planar bearing surfaces which, relative to each other, have a low coefficient of friction, one pad of each pair being mounted to the structure with its bearing surface disposed substantially normal to the structure at the location of the opening in the structure and facing toward the opening, the other pad of the pair being mounted to the conveyor gallery proximately adjacent the one pad with its bearing surface parallel to and facing the bearing surface of the one pad, the several pad pairs being distributed between the structure and the gallery at spaced locations on the lateral sides of the opening.

2. The combination according to claim 1 in which the coefficient of friction is less than about 0.1.

3. The combination according to claim 2 in which the bearing surface of at least one of the pads in each pair of pads is defined at least in part by polytetrafluoroethylene.

4. The combination according to claim 1, in which the one pad of each pair of pads is located essentially in the enclosure surface.

5. The combination according to claim 4 in which the space-enclosing structure is a dome, and the cooperating bearing surfaces of each pair of pads are disposed substantially in a respective vertical plane radially of the dome.

6. The combination according to claim 4 in which the space-enclosing structure is a dome, and the pad bearing surfaces are oriented substantially normal to the dome surface at the location of the opening in the dome.

7. The combination according to claim 4 in which the conveyor gallery has upper and lower opposite side corners, and the pad pairs are associated with each of those corners.

\* \* \* \* \*